United States Patent
Al-Yousef et al.

(10) Patent No.: US 8,550,164 B2
(45) Date of Patent: *Oct. 8, 2013

(54) OIL RECOVERY PROCESS FOR CARBONATE RESERVOIRS

(75) Inventors: Ali Abdullah Al-Yousef, Dhahran (SA); Ming Han, Dhahran (SA); Salah Hamad Al-Saleh, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,730

(22) Filed: Aug. 1, 2011

(65) Prior Publication Data

US 2012/0018161 A1    Jan. 26, 2012

Related U.S. Application Data

(63) Continuation-in-part of application No. 12/842,558, filed on Jul. 23, 2010.

(60) Provisional application No. 61/453,329, filed on Mar. 16, 2011.

(51) Int. Cl.
E21B 43/16 (2006.01)
E21B 43/00 (2006.01)

(52) U.S. Cl.
USPC ................................. 166/305.1; 166/369

(58) Field of Classification Search
None
See application file for complete search history.

(56) References Cited

U.S. PATENT DOCUMENTS

| | | | |
|---|---|---|---|
| 1,651,311 A | 11/1927 | Atkinson | |
| 3,474,864 A | 10/1969 | Hurd | |
| 3,477,508 A | 11/1969 | Hurd | |
| 3,827,499 A * | 8/1974 | Norton et al. | 166/305.1 |
| 3,915,230 A | 10/1975 | Flournoy et al. | |
| 4,008,768 A * | 2/1977 | Birk | 166/270.1 |
| 4,036,300 A | 7/1977 | Holm et al. | |
| 4,166,038 A | 8/1979 | Stournas | |
| 4,191,253 A | 3/1980 | Kalfoglou | |
| 4,216,097 A | 8/1980 | Stournas | |
| 4,230,182 A | 10/1980 | Bousaid | |
| 4,232,737 A | 11/1980 | Tyler et al. | |
| 4,266,611 A | 5/1981 | Bousaid et al. | |
| 4,271,906 A | 6/1981 | Bousaid et al. | |
| 4,307,782 A | 12/1981 | Schievelbein | |

(Continued)

FOREIGN PATENT DOCUMENTS

| | | |
|---|---|---|
| CN | 1148660 A | 4/1997 |
| GB | 2455016 A | 6/2009 |

(Continued)

OTHER PUBLICATIONS

Babadagli, et al. "A Laboratory Feasibility Study of Dilute Surfactant Injection for the Yibal Field, Oman" SPE 78352, Presented at the SPE 13th European Petroleum Conference, Aberdeen, Scotland, U.K., Oct. 29-31, 2002.

(Continued)

*Primary Examiner* — Angela M DiTrani
(74) *Attorney, Agent, or Firm* — Bracewell & Giuliani LLP

(57) ABSTRACT

A method for increasing oil production in a carbonate reservoir by incorporating a diluted surfactant injection in conjunction with conducting a step-wise reduction of salinity of the injected salt water that is injected into the carbonate reservoir. The method provides for increased oil production as compared to conventional waterflooding techniques.

31 Claims, 2 Drawing Sheets

(56) References Cited

U.S. PATENT DOCUMENTS

| | | | |
|---|---|---|---|
| 4,343,711 A | 8/1982 | Kalfoglou | |
| 4,364,431 A | 12/1982 | Saidi et al. | |
| 4,421,168 A | 12/1983 | Hurd | |
| 4,438,814 A | 3/1984 | Bousaid | |
| 4,448,698 A | 5/1984 | Trushenski | |
| 4,458,760 A | 7/1984 | Hurd | |
| 4,825,950 A * | 5/1989 | Kalpakci et al. | 166/270.1 |
| 5,014,783 A | 5/1991 | McClure | |
| 2009/0194276 A1 | 8/2009 | Sheng | |
| 2009/0194281 A1 | 8/2009 | Sheng | |

FOREIGN PATENT DOCUMENTS

| | | |
|---|---|---|
| WO | WO 2006/134367 A1 | 12/2006 |
| WO | WO 2009/047480 A1 | 4/2009 |
| WO | 2011011284 | 1/2011 |
| WO | 2012012235 | 1/2012 |

OTHER PUBLICATIONS

Michels, et al. "Enhanced Waterflooding Design With Dilute Surfactant Concentrations for North Sea Conditions" SPE Reservoir Engineering, Aug. 1996, 11(3):189-195.

Yousef, et al., "Laboratory Investigation of Novel Oil Recovery Method for Carbonate Reservoirs", SPE 137634, Presented at the Canadian Unconventional Resources & International Petroleum Conference, Calgary, Canada, Oct. 19-21, 2010.

PCT International Search Report; Dated Sep. 16, 2011; International Application No. PCT/US2011/043829; International Filing Date: Jul. 13, 2011.

Buckley, J., "An Overview of Likely Mechanisms" Low Salinity Waterflooding, Jan. 15, 2009, http://eori.uwyo.edu.

Rezaeidoust, A., Puntervold, T., Strand, S. and Austad T., "Smart Water as Wettability Modifier in Carbonate and Sandstone: A Discussion of Similarities/Differences in the Chemical Mechanisms" Energy Fuels Article, Aug. 12, 2009, 4479-4485, 23, American Chemical Society.

Xie, S., Pu, H.and Morrow, N., "Aspects of Waterflooding" University of Wyoming, Jan. 13, 2010, Denver, CO.

PCT International Search Report dated Jun. 14, 2012, International Application No. PCT/US2012/028739.

Alagic, Edin, et al. "Combined Low Salinity Brine Injection and Surfactant Flooding in Mixed-Wet Sandstone Cores," Energy Fuels, 2010, 3551-3559 (Published on web May 21, 2010).

Buckley, Jill. presentation on "Low Salinity Waterflooding: An Overview of Likely Mechanisms," pp. 1-28, Enhanced Oil Recovery Institute, Adjunct, Dept. of Chem. and Petroleum Eng. University of Wyoming, Jan. 15, 2009, Retrieved from the Internet: URL:www.uwyo.edu/eori/files/eorctab_jan09/buckley_mechanisms.pdf, [retrieved on Sep. 8, 2011].

Xie, Sheena, et al. presentation on "Aspects of Waterflooding," Enhanced Oil Recovery Institute, University of Wyoming, Jan. 13, 2010, Retrieved from the Internet: URL:http://www.uwyo.edu/eori/files/Jan10_joint_meetings_presentations/Xina%20Xie%20-%20EORI%20-%20Effect%20of%20Wettability%20on%20Reservoir%20Rock%20Waterflooding.pdf, [retrieved on Sep. 9, 2011].

Tang, G.Q., et al. "Salinity, Temperature, Oil Composition, and Oil Recovery by Waterflooding," SPE Reservoir Engineering, Univerity of Wyoming, Nov. 1997.

Austad, T., et al. "Seawater as IOR Fluid in Fractured Chalk," 2005 S{E International Symposium on Oilfield Chemistry, Houston, Texas, SPE 93000, Feb. 2-4, 2005, Society of Petroleum Engineers, Inc.

Austad, T., et al. "Seawater in Chalk: An EOR and Compaction Fluid, Reservoir Evaluation & Engineering," 2007 International Petroleum Technology Conference, Dubai, SPE 118431, Dec. 4-6, 2007, Society of Petroleum Engineers, Inc.

Doust, A.R., et al., "Smart Water as Wettability Modifier in Carbonate and Sandstone," 15th European Symposium on Improved Oil Recovery, Pails, France, Apr. 27-29, 2009.

Lager, A., et al., "Low Salinity Oil Recovery—An Experimental Investigation," International Symposium of the Society of Core Analysis, SCA2006-36, Trondheim, Norway, Sep. 12-16, 2006.

Lager, A., et al., "LoSal Enhanced Oil Recovery: Evidence of Enhanced Oil Recovery at the Reservoir Scale," Presented at the 2008 SPE/DOE Improved Oil Recovery Symposium, Tulsa, Oklahoma, SPE 113976, Apr. 19-23, 2008, Society of Petroleum Engineers, Inc.

Morrow, N.R., et al., "Prospects of Improved Oil Recovery Related to Wettability and Brine Composition," Journal of Petroleum Science and Engineering, Jan. 21, 1998, pp. 267-276, vol. 20, Elsevier Science B.V.

Robertson, E.P., et al., "Improved Waterflooding Through Injection-Brine Modification," U.S. Department of Energy Assistant Secretary for Office of Fossil Energy Under DOE Idaho Operations Office Contract DE-AC07-99ID13727, INEE/EXT-02-01591, Jan. 2003.

Strand, S., et al., "Wettability Alteration of Carbonates—Effects of Potential Determining Ions (CA 2+ and SO 4 2−) and Temperature," Colloids and Surfaces, Oct. 27, 2005, Elsevier B.V., Available online at www.sciencedirect.com.

Tang, G.Q., et al., "Salinity, Temperature, Oil Composition, and Oil Recovery by Waterflooding," Presented at the 1996 SPE Annual Technical Conference and Exhibition, Denver, Colorado, SPE 36680, Oct. 6-9, 2006, pp. 269-276, Society of Petroleum Engineers, Inc.

Tang, G.Q., et al., "Influence of Brine Composition and Fines Migration on Crude Oil/Brine/Rock Interactions and Oil Recovery," Journal of Petroleum Science and Engineering, 1999, pp. 99-111, vol. 24, Elsevier Science B.V.

Tweheyo, M.T., et al., "The Effects of Temperature and Potential Determining Ions Present in Seawater on Oil Recovery From Fractured Carbonates," Presented at the 2006 SPE/DOE Symposium on Improved oil Recovery, Tulsa, Oklahoma, SPE 99438, Apr. 22-26, 2006, Society of Petroleum Engineering, Inc.

Webb, K.J., et al., "Low Salinity Oil Recovery—Long-Inject-Long," Presented at the 2005 SPE/DOE Fourteenth Symposium on Improved Oil Recovery, Tulsa, Oklahoma, SPE 89379, Apr. 17-21, 2004, Society of Petroleum Engineers, Inc.

Zhang, P., et al., "Wettability Alteration and Improved Oil Recovery by Spontaneous Imbibition of Seawater Into Chalk: Impact of the Potential Determining Ions Ca 2+, Mg 2+, and SO 4 2−," Colloids and Surfaces, Dec. 15, 2006, Elsevier B.V., Available online at www.sciencedirect.com.

Zhang, Y., et al., "Comparison of Secondary and Tertiary Recovery With Change in Injection Brine Composition for Crude Oil/Sandstone Combinations," Presented at the 2006 SPE/DOE Symposium on Improved Oil Recovery, Tulsa, Oklahoma, SPE 99757, Apr. 22-28,2006, Society of Petroleum Engineers, Inc.

* cited by examiner

OIL RECOVERY PROCESS FOR CARBONATE RESERVOIRS

RELATED APPLICATIONS

This nonprovisional patent application is a continuation-in-part application of, and claims priority to co-pending, nonprovisional patent application U.S. Pub. 2012/0018160, which was filed as U.S. Ser. No. 12/842,558 on Jul. 23, 2010, and which is incorporated by reference in its entirety, and provisional patent application U.S. Ser. No. 61/453,329, filed on Mar. 16, 2011.

TECHNICAL FIELD OF THE INVENTION

The present invention relates to a process for improving oil recovery in carbonate reservoirs. More specifically, embodiments of the present invention utilize sequential salinity reduction waterflooding in conjunction with dilute surfactant flooding.

BACKGROUND OF THE INVENTION

The petroleum industry has recognized for decades that only a portion of original oil in place (OOIP) in oil-bearing reservoirs is produced by natural mechanisms. It is also well-known that conventional methods of supplementing natural recovery are relatively inefficient. Typically, a reservoir may retain half of its original oil in place even after the application of currently available methods of secondary recovery. Accordingly, there is a continuing need in improving recovery methods, which will substantially increase the ultimate petroleum recovery of subterranean reservoirs.

Waterflooding

Waterflooding is a method of secondary recovery in which water is injected into a reservoir formation to displace mobile oil within the reservoir formation. The water from injection wells physically sweeps the displaced oil to adjacent production wells, so that the oil can be collected from the production wells. Generally, the water used in a waterflooding process is taken from nearby water sources, which is usually either seawater or produced water.

It is known that a reduction in salinity values of the injected water can increase oil production for sandstone reservoirs. However, the low salinity floods have only been shown to work if the reservoir contains clays and with water having salinity values that are less than 5,000 ppm.

Carbonate reservoirs do not contain such clays. As such, the low salinity water flooding teachings known heretofore specifically teach away from the successful use of low salinity water for carbonate reservoirs. See A. Lager et al., "*Low Salinity Oil Recovery—An Experimental Investigation*," paper presented at the Society of Core Analysts, September 2006 ("Finally it explains why LoSal™ does not seem to work on carbonate reservoirs."). See also A. R. Doust et al., "*Smart Water as Wettability Modifier in Carbonate and Sandstone*," paper presented at 15$^{th}$ European Symposium on Improved Oil Recovery, April 2009 ("The wettability modification in carbonates can take place at high salinities, i.e. SW salinity. If SW is diluted by distilled water to a low saline fluid, ~2000 ppm, the oil recovery will decrease due to a decrease in the active ions.").

Surfactant Flooding

It is known to add aqueous surfactants to injection water in order to lower the oil-water interfacial tension and/or alter the wettability characteristics of reservoir rocks. However, the previously known methods involved the injection of an aqueous surfactant solution in high surfactant concentration known as micellar or microemulsion flooding. The objective was to displace residual oil and water miscible by a mutually soluble solvent using an injected slug of micellar solution (containing a mixture of a surfactant, a co-surfactant, brine and oil), so that an oil bank was formed in the subterranean formation before its production started. This art is commonly used in tertiary recovery mode with a high surfactant concentration of 1 wt % to 10 wt % (10,000 ppm to 100,000 ppm).

The high costs associated with classical surfactant flooding techniques described above have inhibited the implementation of this technique, particularly in harsh environments. Non-limiting examples of harsh environments include reservoirs with high reservoir temperatures, high brine salinities, and fractured carbonate. As a consequence, research into surfactant flooding has been focused on using dilute surfactant solutions in an attempt to reduce costs.

The use of high salinity water, particularly at elevated temperatures, presents a major challenge for dilute surfactant flooding. For example, high salinity causes low efficiency of surfactants in several ways, including high interfacial tension between the dilute surfactant solution and crude oil, high adsorption onto the reservoir rock surface, and precipitation of white, cloudy, solid materials.

Therefore, it would be desirable to have an improved process for waterflooding carbonate reservoirs that was simple and efficient. Preferably, it would be desirable to have a process that did not require the use of complicated chemicals or gases such as carbon dioxide, polymers, or the like. Preferably, it would be desirable to have a process that did not use a substantial amount of surfactant, thereby allowing the process to be more economical. Additionally, it would be beneficial if the process for an improved waterflooding could be implemented with existing infrastructure.

SUMMARY OF THE INVENTION

The present invention is directed to a process that satisfies at least one of these needs. In one embodiment, the process for recovering hydrocarbons in carbonate reservoirs includes the steps of introducing a first saline solution into the carbonate reservoir, recovering an amount of hydrocarbon from the carbonate reservoir, introducing a second saline solution into the carbonate reservoir, introducing a third saline solution into the carbonate reservoir, and recovering a second amount of hydrocarbon from the carbonate reservoir. The first saline solution has a first salt concentration, the second saline solution has a second salt concentration that is lower than the first salt concentration, and the third saline solution has a third salt concentration that is lower than the first salt concentration. The first saline solution includes water, salt, and an absence of a surfactant. The second saline solution includes water, salt, and a surfactant. The third saline solution includes water and salt. In one embodiment, the third saline solution is substantially free of a surfactant. In another embodiment, the third saline solution consists essential of water and salt.

In one embodiment, the first saline solution, the second saline solution, and the third saline solution further include an absence of a polymer. In another embodiment, the second saline solution has a surfactant concentration in an amount at about a critical micelle concentration of the second saline solution, such that a microemulsion is not formed when the second saline solution is injected into the carbonate reservoir. Those of ordinary skill in the art will recognize that the critical micelle concentration can be determined by a surface tension measurement known in the art. In one embodiment, the second saline solution has a surfactant concentration in an amount within the range of about 300 ppm and about 1000 ppm by weight. In another embodiment, the second saline solution has a surfactant concentration of about 500 ppm by weight.

In one embodiment, the ratio of the second salt concentration to the first salt concentration is in a range from about 1:10 to 9:10, more preferably from about 1:10 to 1:2, and more preferably, about 1:2.

In an embodiment, the first salt concentration is within a range of 35,000 to 70,000 ppm by weight. In another embodiment, the second salt concentration is within a range of 3,500 to 60,000 ppm by weight. In another embodiment, the second salt concentration is within a range of 17,500 to 52,500 ppm by weight. In another embodiment, the second salt concentration is within a range of 17,500 to 35,000 ppm by weight. In another embodiment, the process is conducted at a reservoir temperature of not less than about 70° C. and not more than about 120° C., more preferably about 100° C.

In one embodiment, the first saline solution can include at least two ions selected from the group consisting of sulfate ions, calcium ions, magnesium ions, and combinations thereof. In another embodiment, the first saline solution can include sulfate ions, calcium ions, and magnesium ions.

In one embodiment, the surfactant of the second saline solution is an amphoteric surfactant. Amphoteric surfactants are a type of surfactants that have two function groups, one anionic and one cationic. Non-limiting examples of amphoteric surfactants include sulfonates, carboxylates, and phosphates. In one embodiment, the surfactant can include sulfonate betaine having a $C_{12}$ to $C_{24}$ hydrophobic tail or carboxyl betaine having a $C_{12}$ to $C_{24}$ hydrophobic tail. In another embodiment, the surfactant may also include a co-surfactant, for example, ethylene glycol mono butyl ether In one embodiment, the ratio of the third salt concentration to the first salt concentration can be in a range from about 1:10 to 9:10. In another embodiment, the third salt concentration is not greater than the second salt concentration. In another embodiment, the third salt concentration is within a range of 1,750 to 7,000 ppm by weight. In another embodiment, the third salt concentration is within a range of 3,500 to 7,000 ppm by weight.

In one embodiment, the recovering step is continued until the second amount of hydrocarbon recovered provides at least a 9% improvement in incremental oil recovery. In another embodiment, the recovering step is continued until the second amount of hydrocarbon recovered provides at least a 15% improvement in incremental oil recovery.

In one embodiment, the carbonate reservoir is substantially free of clay; more preferably, the carbonate reservoir has an absence of clay. In one embodiment, the carbonate reservoir has an absence of sandstone rock.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
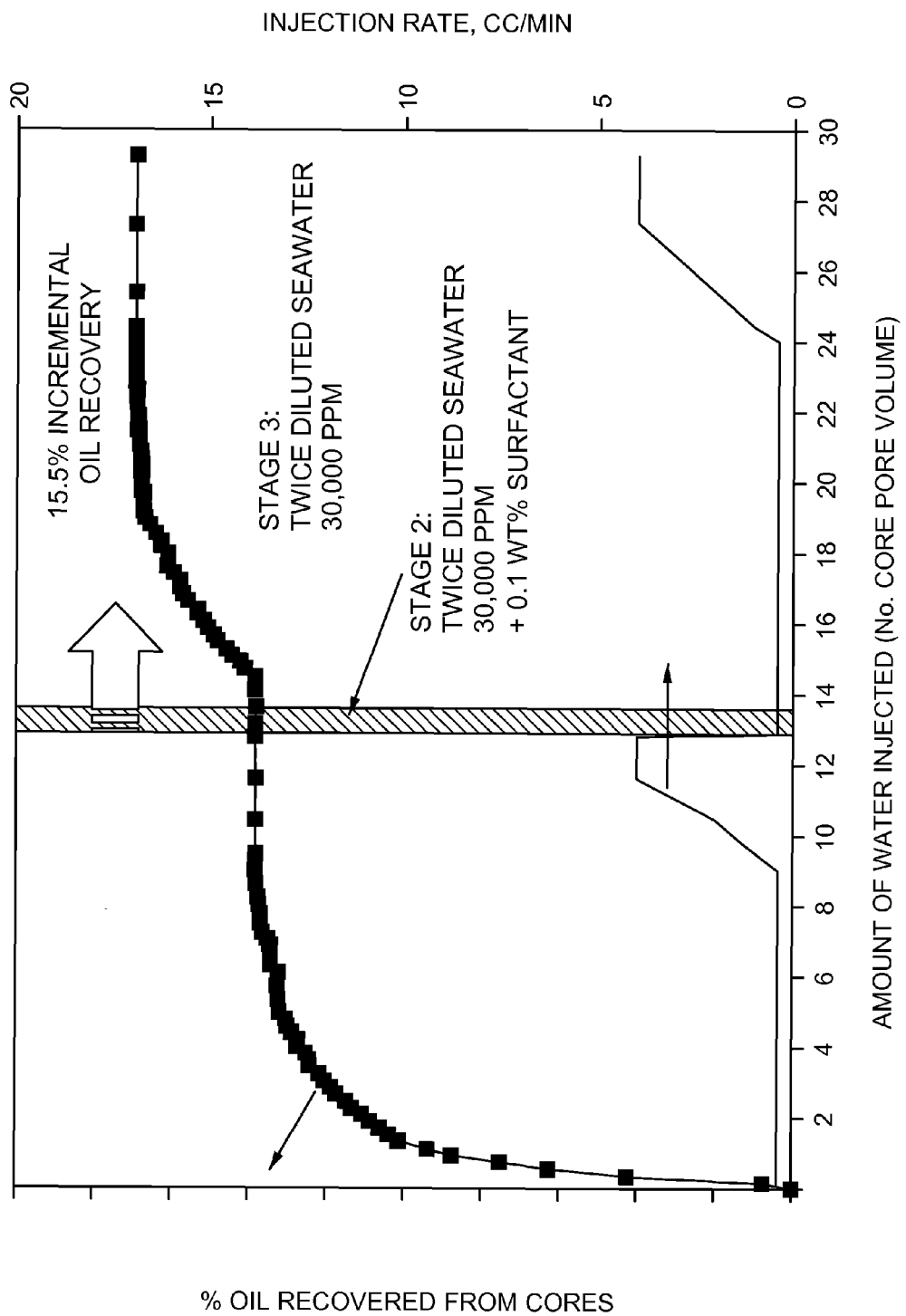
FIG. 1 shows data collected from an experiment in accordance with an embodiment of the present invention.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, the process for improving tertiary hydrocarbon recovery in carbonate reservoirs includes the steps of introducing a first saline solution into the carbonate reservoir, recovering an amount of hydrocarbon from the carbonate reservoir, introducing a second saline solution into the carbonate reservoir, introducing a third saline solution into the carbonate reservoir, and recovering a second amount of hydrocarbon from the carbonate reservoir. The first saline solution has a first salt concentration, and the second saline solution has a second salt concentration that is lower than the first salt concentration. In one embodiment, the first saline solution has an ion composition that includes at least two ions selected from the group consisting of sulfate, calcium, magnesium, and combinations thereof. The second saline solution includes water, salt, and a surfactant. The third saline solution preferably excludes a surfactant, and has a salt concentration that is lower than the first salt concentration.

The present invention is illustrated by the following examples, which are presented for illustrative purposes, only, and are not intended as limiting the scope of the invention which is defined by the appended claims:

Example 1

A coreflooding study was conducted to demonstrate an embodiment of the invention. The experimental parameters and procedures were designed to reflect the initial conditions commonly found in carbonate reservoirs, as well as the current field injection practices.

The core material was selected from a carbonate reservoir in Saudi Arabia. Core plugs (1-inch in diameter, and 1.5-inch in length) were cut from whole cores. One composite core was selected for the coreflood experiments. Table I shows the petrophysical properties of the selected cores. The average porosity and liquid permeability are 25% and 2.4 Darcy, respectively.

TABLE I

Basic Petrophysical Properties for Core Plugs

| Sample # | Length (cm) | Dia. (cm) | Liquid Permeability (D) | Irreducible Water Saturation (%) | Porosity (%) | Pore Volume by Routine Core analysis (cc) |
|---|---|---|---|---|---|---|
| 124 | 3.44 | 3.80 | 2.4 | 20.34 | 23.6 | 5.15 |
| 148 | 4.25 | 3.81 | 2.35 | 19.68 | 26.7 | 5.24 |
| Total | 7.69 | 3.80 | 2.38 | 20.01 | 25.15 | 10.39 |

The most predominant mineral in the selected carbonate cores is calcite (more than 90 wt %). Other minerals are dolomite (trace up to 9 wt %), and a minor amount (<1 wt %) of quartz.

Two brines were primarily used in this study, including field connate water, to establish initial or irreducible water saturation (Swi) for composite cores, and to use as injected waters for different salinity slugs of seawater to displace oil out of the cores. All brines were prepared from distilled water and reagent grade chemicals, based on geochemical analysis of field water samples. Table II depicts the geochemical analysis and the corresponding chemicals concentration for each type of brine. For the experiments described below, the seawater had a salinity of about 57,700 ppm by weight. Initial connate water had a much higher salinity of 214,000 ppm by weight.

TABLE II

Geochemical Analysis and Salt Concentrations for Major Sources of Water

| Ions | Field Connate Water | seawater |
|---|---|---|
| Sodium | 59,491 | 18,300 |
| Calcium | 19,040 | 650 |
| Magnesium | 2,439 | 2,110 |
| Sulfate | 350 | 4,290 |
| Chloride | 132,060 | 32,200 |
| Carbonate | 0 | 0 |
| Bicarbonate | 354 | 120 |
| TDS | 213,734 | 57,670 |

The salt recipes for major sources of water

| Salts | UTMN Connate Water | Qurayyah seawater |
|---|---|---|
| NaCl, g/L | 150.446 | 41.041 |
| $CaCl_2 \cdot 2H_2O$, g/L | 69.841 | 2.384 |
| $MgCl_2 \cdot 6H_2O$, g/L | 20.396 | 17.645 |
| $Na_2SO_4$, g/L | 0.518 | 6.343 |
| $NaHCO_3$, g/L | 0.487 | 0.165 |

Twice diluted seawater was also prepared by mixing an equal volume of deionized water with the seawater. The surfactant used for this experiment was SS-887, provided by Oil Chem. This particular surfactant is an amphoteric surfactant having ethylene glycol mono butyl ether as a co-surfactant. Surfactant was added to the twice diluted seawater such that the resulting mixture contained approximately 300 ppm to 1000 ppm by weight surfactant. The density of the mixture was 1.001 g/ml at 185° F. The viscosity was measured to be 0.338 cP at 185° F. The interfacial tension (IFT) between oil and mixture was 0.0834 dynes/cm and 0.0301 dynes/cm at concentrations 500 ppm and 1000 ppm, respectively.

Reservoir oil samples were collected from the same carbonate reservoirs. Crude oil filtration was conducted to remove solids and contaminants to reduce any experimental difficulties during coreflood experiments. In order to increase the accuracy of the experiment, live oil (e.g., oil which was recombined from an oil/gas separator) was used such that the experimental conditions more closely resembled reservoir conditions. As used herein, live oil is oil containing dissolved gas in solution that can be released from solution at surface conditions. Oil in reservoirs usually contains dissolved gas, and once it reaches the surface, gas tends to evolve out due to the lower pressures at the surface as compared to within the reservoir. As used herein, dead oil is oil at sufficiently low pressure that it contains no dissolved gas. Total acid number and other oil properties are listed in Table III.

TABLE III

Reservoir Oil Properties for Collected Oil Samples

| Component | Amount |
|---|---|
| Saturates, % | 40.57 |
| Aromatics, % | 51.75 |
| Resins, % | 5.55 |
| Asphaltenes, % | 2.03 |
| Total Acid Number, mg KOH/g oil | 0.05 |
| Saturation pressure, psia @ 212° F. | 1804 |

TABLE III-continued

Reservoir Oil Properties for Collected Oil Samples

| Component | Amount |
|---|---|
| Gas oil ratio, SCF/STB | 493 |
| Stock tank oil gravity °API @ 60° F. | 30.0 |
| Dead oil density at room temperature, $lb/ft^3$ | 54.50 |
| Dead oil viscosity at room temperature, cp | 14.59 |
| Dead oil density at 185° F., lb/ft3 | 51.81 |
| Dead oil viscosity at 185° F., cp | 2.807 |

The pore volume of cores, original oil in place, and connate water saturation of selected composite core plugs were determined using a centrifuge apparatus. The procedure for preparation of each core was as follows:

1. Measure dry weight.
2. Saturate core plug under vacuum for 5-7 days with field connate water to achieve ionic equilibrium with the core samples.
3. Measure wet weight.
4. Determine pore volume using weight difference and the density of field connate water at room temperature.
5. Centrifuge each core plug at 5000 rpm for 12 hrs to drain the water in the pores and establish the initial water saturation.
6. Measure weight of centrifuged core sample.
7. Determine the original oil in place (OOIP) and initial water saturation by weight difference—prior and post centrifuge—and the density of field connate water.

Table 4 shows the pore volume calculation results using the centrifuge method with the initial water saturation for core plugs used in coreflood experiment. The total pore volume for the composite was 10.39 cc, and original oil in place (OOIP) was 8.31 cc. The average initial water saturation for the composite was 20%. The position of each core plug in the composite sample is ordered by a harmonic arrangement. The plugs are organized in Table IV as the first plug from the inlet to the last plug from outlet of the coreholder.

TABLE IV

Pore Volume Determination and Swi % Results for Coreflooding Experiment

| Sample # | Dry wt, g | Wet wt, g | Liquid wt, g | Pore Volume, cc | Post Wet wt, g | Wet wt diff., g | $S_{wi}$ |
|---|---|---|---|---|---|---|---|
| 124 | 80.16 | 86.07 | 5.91 | 5.15 | 81.54 | 4.53 | 0.2034 |
| 148 | 83.41 | 89.43 | 6.02 | 5.24 | 84.77 | 4.66 | 0.1968 |
| | | | | 10.39 | | | 0.2001 |

A coreflooding apparatus was then used to mimic reservoir conditions during a waterflood experiment. The experimental procedure followed is described below:

Each plug used in a composite was saturated with connate water by introducing degassed brine into an evacuated vessel containing the dry plugs. After obtaining saturated weights, the plugs were centrifuged to connate water saturation, Swi, followed by a dead oil flush. Core plugs were aged in crude oil (dead oil) for 4 weeks. The composite now replicates the carbonate reservoir in terms of fluid saturations, reservoir temperature and pressure, as well as wettability status.

During the water flooding, the amount of oil produced, pressure drop across the composite, and injection rate were all monitored. Water was injected at constant rate of 1 cc/min until no more oil was produced. The injection rate was increased up to 8 pore volumes of composite cores to ensure that all mobile oil was produced. Another practice implemented to make sure that mobile oil was produced is that the injection rate is first raised to 2 cc/min and then to 4 cc/min, and the injection rate is dropped back to 1 cc/min, at the end of this phase. This practice takes another 2 pore volumes.

The composite cores were then injected with one pore volume of 1000 ppm surfactant solution in a twice diluted seawater (i.e., salinity of 28,800 ppm). The objective of this slug is to determine the impact of the surfactant solution on oil recovery process. The coreflood was resumed by injection of twice diluted seawater as a succeeding waterflood. This third injection did not contain any appreciable amounts of surfactants. The effluent brine was collected in aliquot and brine ion analyses were performed to see the changes of ion concentrations in the effluent.

At the end of coreflood experiment, the composite was allowed to equilibrate at ambient conditions and the individual core plug sample removed. After the experiment, the composite core was put in the Dean-Stark extraction device to verify the oil recovery. The results from this experiment are shown in FIG. 1.

FIG. 1 displays an oil recovery curve expressed in percentage of oil recovered. The oil recovery by seawater flooding is about 69% in terms of original oil in place (OOIP); this targets mobile oil in the cores, and represents the secondary oil recovery. The additional oil recovery (i.e., that over secondary recovery) was about 15.5% of OOIP with twice diluted seawater.

Figure 2:
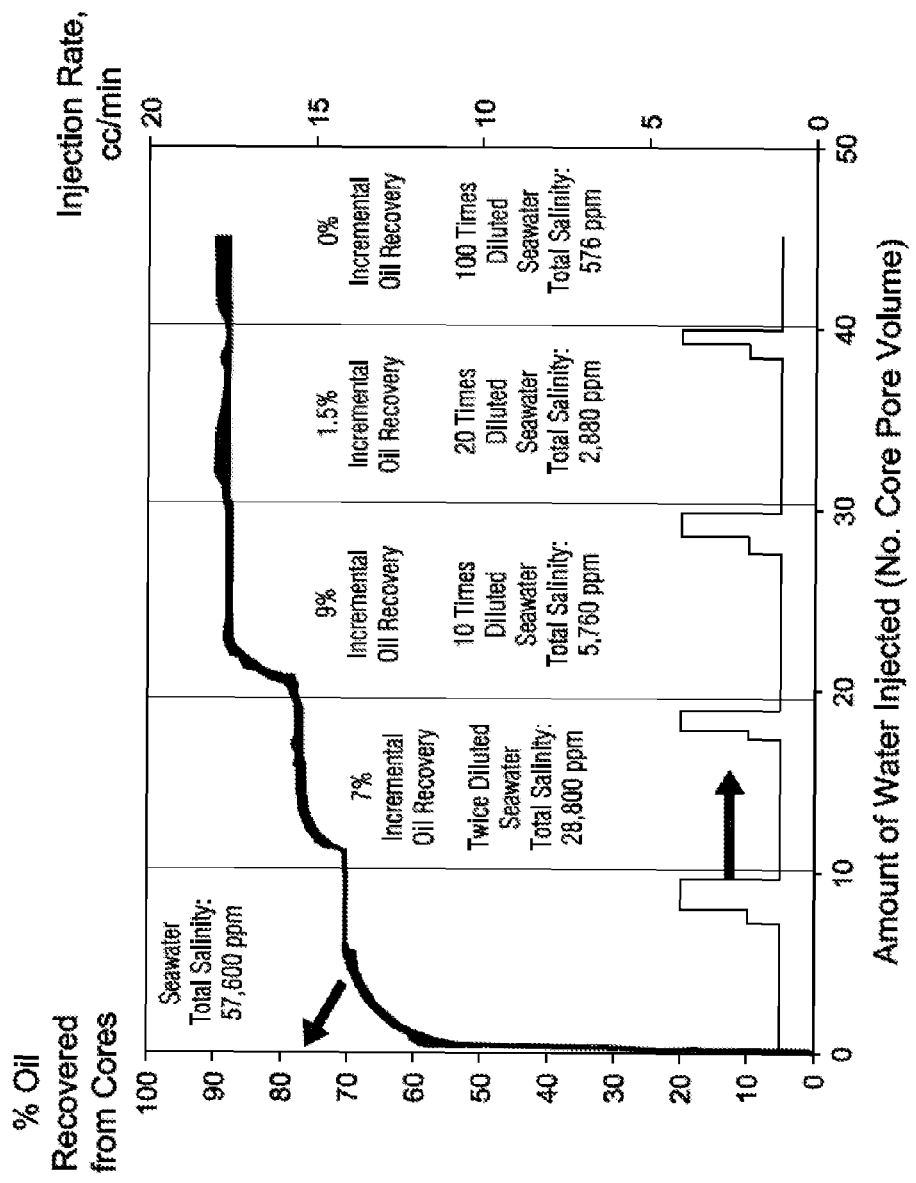
FIG. 2 shows data collected from an experiment in accordance with the prior art.

FIG. 2 displays an oil recovery curve expressed in percentage of oil recovered for a similar setup but without the surfactant injection. The oil recovery by seawater flooding is about 67% in terms of OOIP. Therefore, the additional oil recovery (i.e., that over secondary recovery) was about 7% of OOIP with twice diluted seawater. As such, embodiments of the present invention that include a surfactant injection can help to increase the recovery of the OOIP over methods known heretofore.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

We claim:

1. A process for recovering hydrocarbons in a carbonate reservoir, the process comprising the steps of:
   (a) introducing a first saline solution into the carbonate reservoir, wherein the first saline solution has a first salt concentration, wherein the first saline solution comprises water, salt, and an absence of a surfactant;
   (b) recovering an amount of hydrocarbon from the carbonate reservoir;
   (c) introducing a second saline solution into the carbonate reservoir, wherein the second saline solution has a second salt concentration that is lower than the first salt concentration, wherein the second saline solution comprises water, salt, and surfactant;
   (d) introducing a third saline solution into the carbonate reservoir, wherein the third, saline solution has a third salt concentration that is tower than the first salt concentration, wherein the third saline solution comprises water and salt; and
   (e) recovering a second amount of hydrocarbon from the carbonate reservoir.

2. The process as claimed in claim 1, wherein the first saline solution, the second saline solution, and the third saline solution further comprise an absence of a polymer.

3. The process as claimed in claim 1, wherein the second saline solution has a surfactant concentration in an amount at about a critical micelle concentration of the second saline solution, such that a microemulsion is not formed when the second saline solution is injected into the carbonate reservoir.

4. The process as claimed in claim 1, wherein the second saline solution has a surfactant concentration in an amount within the range of about 300 ppm and about 1000 ppm by weight.

5. The process as claimed in claim 1, wherein the second saline solution has a surfactant concentration of about 500 ppm by weight.

6. The process as claimed in claim 1, wherein the surfactant of the second saline solution comprises an amphoteric surfactant.

7. The process as claimed in claim 6, wherein the surfactant of the second saline further comprises a co-surfactant.

8. The process as claimed in claim 7, wherein the co-surfactant is ethylene glycol mono butyl ether.

9. The process as claimed in claim 1, wherein the surfactant of the second saline solution is selected from the group consisting of sulfates, carboxylates, phosphates, and combinations thereof.

10. The process as claimed in claim 1, wherein the surfactant of the second saline solution is selected from the group consisting of sulfonate betaine having a $C_{12}$ to $C_{24}$ hydrophobic tail, carboxyl betaine having a $C_{12}$ to $C_{24}$ hydrophobic tail, and combinations thereof.

11. The process as claimed in claim 1, wherein the ratio of the second salt concentration to the first salt concentration is in a range from about 1:10 to 9:10.

12. The process as claimed in claim 1, wherein the ratio of the second salt concentration to the first salt concentration is in a range from about 1:10 to 1:2.

13. The process as claimed in claim 1, wherein the ratio of the second salt concentration to the first salt concentration is about 1:2.

14. The process as claimed in claim 1, wherein the first salt concentration is within a range of 35,000 to 70,000 ppm by weight.

15. The process as claimed in claim 1, wherein the second salt concentration is within a range of 3,500 to 60,000 ppm by weight.

16. The process as claimed in claim 1, wherein the second salt concentration is within a range of 17,500 to 52,500 ppm by weight.

17. The process as claimed in claim 1, wherein the second salt concentration is within a range of 17,500 to 35,000 ppm by weight.

18. The process as claimed in claim 1, wherein the first saline solution comprises at least two ions selected from the group consisting of sulfate ions, calcium ions, magnesium ions, and combinations thereof.

19. The process as claimed in claim 1, wherein the first saline solution comprises sulfate ions, calcium ions, and magnesium ions.

20. The process as claimed in claim 1, wherein the temperature within the carbonate reservoir is not less than about 70° C. and not more than about 120° C.

21. The process as claimed in claim 1, wherein the temperature within the carbonate reservoir is about 100° C.

22. The process as claimed in claim 1, wherein the ratio of the third salt concentration to the first salt concentration is in a range from about 1:10 to 9:10.

23. The process as claimed in claim 1, wherein the third saline solution comprises an absence of a surfactant.

24. The process as claimed in claim 1, wherein the third salt concentration is not greater than the second salt concentration.

25. The process as claimed in claim 1, wherein the third salt concentration is within a range of 1,750 to 7,000 ppm by weight.

26. The process as claimed in claim 1, wherein the third salt concentration is within a range of 3,500 to 7,000 ppm by weight.

27. The process as claimed in claim 1, wherein the recovering step is continued until the second amount of hydrocarbon recovered provides at least a 9% improvement in incremental oil recovery.

28. The process as claimed in claim 1, wherein the recovering step is continued until the second amount of hydrocarbon recovered provides at least a 15% improvement in incremental oil recovery.

29. The process as claimed claim 1, wherein the carbonate reservoir is substantially free of clay.

30. The process as claimed in claim 1, wherein the carbonate reservoir has an absence of clay.

31. The process as claimed in claim 1, wherein the carbonate reservoir has an absence of sandstone rock.

* * * * *